United States Patent
Speros et al.

(10) Patent No.: US 11,847,997 B2
(45) Date of Patent: Dec. 19, 2023

(54) AQUEOUS POLYMER EMULSIONS FOR SOUND DAMPING APPLICATIONS

(71) Applicant: BASF SE, Ludwigshafen (DE)

(72) Inventors: Joshua Speros, Wyandotte, MI (US); Glen Cunkle, Southfield, MI (US); Afsaneh Nabifar, Ludwigshafen (DE); Chien Hsu, Southfield, MI (US); Akbar Hussaini, Southfield, MI (US)

(73) Assignee: BASF SE

( * ) Notice: Subject to any disclaimer, the term of this patent is extended or adjusted under 35 U.S.C. 154(b) by 1175 days.

(21) Appl. No.: 16/464,757

(22) PCT Filed: Nov. 29, 2017

(86) PCT No.: PCT/US2017/063570
§ 371 (c)(1),
(2) Date: May 29, 2019

(87) PCT Pub. No.: WO2018/102331
PCT Pub. Date: Jun. 7, 2018

(65) Prior Publication Data
US 2019/0311704 A1    Oct. 10, 2019

Related U.S. Application Data

(60) Provisional application No. 62/428,255, filed on Nov. 30, 2016.

(51) Int. Cl.
*C09D 7/06* (2006.01)
*C09D 133/08* (2006.01)
*C08F 2/22* (2006.01)
*G10K 11/162* (2006.01)
*C09D 7/61* (2018.01)
*C09D 5/02* (2006.01)
*C09D 133/06* (2006.01)
*C08K 3/26* (2006.01)

(52) U.S. Cl.
CPC .............. *G10K 11/162* (2013.01); *C08F 2/22* (2013.01); *C09D 5/022* (2013.01); *C09D 7/61* (2018.01); *C09D 133/062* (2013.01); *C09D 133/08* (2013.01); *C08K 2003/265* (2013.01); *C08K 2201/005* (2013.01); *C08L 2201/52* (2013.01)

(58) Field of Classification Search
CPC ...... C09D 7/61; C09D 5/022; C09D 133/062; C09D 133/08; C08L 2201/52; C08F 2/22; C08K 2003/265; C08K 2201/005

USPC ........................................................ 252/62
See application file for complete search history.

(56) References Cited

U.S. PATENT DOCUMENTS

| | | |
|---|---|---|
| 4,325,856 A | 4/1982 | Ishikawa et al. |
| 4,820,762 A | 4/1989 | Tsaur |
| 6,686,033 B1 | 2/2004 | Chacko |
| 7,176,258 B2 | 2/2007 | Morihiro et al. |
| 7,253,218 B2 | 8/2007 | Hussaini et al. |
| 7,368,494 B2 | 5/2008 | Morihiro et al. |
| 7,420,014 B2 | 9/2008 | Morihiro et al. |
| 7,816,470 B2 | 10/2010 | Kania et al. |
| 7,893,149 B2 | 2/2011 | Hermes et al. |
| 7,893,151 B2 | 2/2011 | Johnson et al. |
| 8,562,850 B2 | 10/2013 | Miyawaki et al. |
| 8,623,463 B2 | 1/2014 | Fonseca et al. |
| 8,664,286 B2 | 3/2014 | Yasui et al. |
| 8,877,848 B1 | 11/2014 | Wang et al. |
| 2007/0048504 A1 | 3/2007 | Dimario |
| 2007/0049697 A1 | 3/2007 | Miyawaki et al. |
| 2007/0088121 A1 | 4/2007 | Miyawaki et al. |
| 2007/0197713 A1 | 8/2007 | Miyawaki et al. |
| 2008/0051499 A1 | 2/2008 | Kania et al. |
| 2009/0286933 A1 | 11/2009 | Nagaishi et al. |
| 2012/0027941 A1* | 2/2012 | Fonseca .................. C09D 7/61 252/62 |
| 2012/0043493 A1 | 2/2012 | Fonseca et al. |
| 2015/0097136 A1 | 4/2015 | Wulff et al. |
| 2015/0166803 A1 | 6/2015 | Jhaveri et al. |

FOREIGN PATENT DOCUMENTS

EP    2 058 364 A2    5/2009

OTHER PUBLICATIONS

International Preliminary Report on Patentability in International Application No. PCT/US2017/063570 dated Jun. 13, 2019 (11 pages).
International Search Report and Written Opinion in International Application No. PCI/US2017/063570 dated Mar. 14, 2018 (19 pages).

* cited by examiner

*Primary Examiner* — Kelechi C Egwim
(74) *Attorney, Agent, or Firm* — Faegre Drinker Biddle & Reath LLP

(57) ABSTRACT

A method of damping mechanical vibration includes applying on a source of mechanical vibration a formulation including an aqueous polymer emulsion prepared by an emulsion polymerization reaction of at least one emulsion-polymerizable monomer and a support resin.

16 Claims, 2 Drawing Sheets

AQUEOUS POLYMER EMULSIONS FOR SOUND DAMPING APPLICATIONS

CROSS-REFERENCE TO RELATED APPLICATIONS

This application is a U.S. National Phase Application under 35 U.S.C. § 371 of International Application No. PCT/US2017/063570, filed on Nov. 29, 2017, which claims the benefit of priority to U.S. Provisional Patent Application No. 62/428,255, filed on Nov. 30, 2016, which are each incorporated herein by reference in their entireties for any and all purposes.

FIELD

The present technology is generally related to the field of polymers and in particular, for aqueous polymer emulsions, their methods of making and their uses in sound damping applications.

SUMMARY

In one aspect, provided herein is a method of damping mechanical vibration. The method includes applying on a source of mechanical vibration a formulation that includes an aqueous polymer emulsion prepared by an emulsion polymerization reaction of an emulsion-polymerizable monomer and a support resin, wherein the aqueous polymer emulsion is free of surfactant.

In one aspect, provided herein is an article of manufacture that includes a source of mechanical vibration and a damping formulation deposited on the source of mechanical vibration. The damping formulation includes an aqueous polymer emulsion prepared by an emulsion polymerization reaction of an emulsion-polymerizable monomer and a support resin, wherein the aqueous polymer emulsion is free of surfactant. The damping formulation is configured to damp the mechanical vibration.

In one aspect, provided herein is a formulation that includes an aqueous polymer emulsion prepared by an emulsion polymerization reaction of a mixture that includes an emulsion-polymerizable monomer and a support resin. The emulsion-polymerizable monomer may include about 20 wt % to about 90 wt % of n-butyl acrylate, ethyl acrylate, or a mixture thereof; and 10 to 80 wt % of methyl (meth) acrylate.

DETAILED DESCRIPTION

Unless otherwise specified "a" and "an" means one or more.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6- disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, the term acrylate or (meth)acrylate refers to acrylic or methacrylic acid, esters of acrylic or methacrylic acid, and salts, amides, and other suitable derivatives of acrylic or methacrylic acid, and mixtures thereof. Illustrative examples of suitable (meth)acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butylacrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

As used herein, the term styrene refers to styrene or α-methylstyrene.

As used herein, the term "support resin" refers to a low molecular weight copolymer containing styrene, acrylic, and acidic monomers that can be dispersed in water upon neutralization of the acidic component. Illustrative examples of a support resin include a carboxylic acid-functional support resin. Another example of a support resin includes one that is about 50 wt % styrene, about 25 wt % acrylic acid, and about 25 wt % (meth)acrylate.

To decrease the noise generated by vibrations in vehicles, appliances and machinery, damping materials are applied to the vibrating areas to effectively dissipate the vibrational energy. Applying mastic or asphaltic pads to the vibrating surfaces can dissipate some of the vibrational energy, but this process is labor intensive in the application and expensive as complicated shapes must be produced to cover the critical areas. Vibration damping coatings which are epoxy or PVC based are also used yet these are expensive and contain volatile organic compounds which can create a hazard when applying the coating. Neither of these damping technologies offers a cost effective and low VOC solution for effective damping for vehicles, appliances and machinery.

Formulations containing aqueous emulsions of acrylic polymers are known in the art to be very effective in vibration damping. These formulations are water-based and do not contain any hazardous volatile organic chemicals. They are viscous materials which can be applied by various techniques, but are most often robotically sprayed onto the substrate which minimizes the labor of application and allows the material to be applied only in areas which need damping and in customized thicknesses to reach the desired level of vibrational damping. By applying only in specific locations with customizable thicknesses, material is not wasted and no extra weight is added to the final product: a desirable attribute for transportation where fuel efficiency is critical.

There is still a need in the industry to have improved aqueous emulsions for better damping performance, better formulation properties and improved ancillary properties such as water resistance and toughness.

The present disclosure describes aqueous polymer emulsions produced by emulsion polymerization using low molecular weight copolymers in liquid applied sound damping (LASD) formulations to produce highly effective damping materials for use in vehicles, appliances and machinery to mitigate the adverse effects of unwanted vibrations. Also disclosed is a method to produce highly effective aqueous polymer emulsions which can be tuned to the desired peak damping temperature.

A typical formulation for a LASD material may comprise one or more of an aqueous polymer emulsion, an inorganic filler, an emulsifying agent and a viscosity modifier. The polymer from the emulsion provides the viscoelastic properties of the final dried product. The proper balance of viscous and elastic properties at the desired temperatures may provide for effective damping properties. The inorganic filler, which may be for example, one or more of calcium carbonate (spent or virgin material), barium sulfate, mica, may provide mass and stiffness to the dried LASD material. Good interaction between the polymer and the filler may improve the viscoelastic balance and enhance the damping characteristics. The emulsifying agent may be used to help disperse the inorganic fillers in the formulation and allow the highly filled formulation to remain fluid, while thickeners may be added to achieve the correct viscosity profile so the material is fluid enough to be pumped and sprayed yet thick enough so it will not sag and flow when applied. Other ingredients may also be added to harden or soften the product. Colorants may also be added. Defoamers may also be added to help in the elimination of trapped air bubbles and other additives may be included to improve the drying/baking characteristics.

Known LASD formulations use traditional aqueous polymer emulsions. Traditional emulsion polymerization relies on the use of small molecule surfactants containing a polar/hydrophilic group and a nonpolar/hydrophobic group. The amphiphilic nature of these materials allows them to effectively stabilize heterogeneous solutions (i.e. polymer particles in water).

The inventors propose using emulsion polymerization methods, which utilize alternative stabilization approaches, for making LASD formulations.

One such stabilization approach, known as electrosteric, combines the concepts of electrostatic (based on charged states) and steric (based on space molecules occupy) stabilization. This technology is disclosed in, for example, U.S. Pat. Nos. 6,686,033; 7,176,258; 7,368,494; 7,420,014; 7,816,470; 7,893,149; 7,893,151; 8,562,850; 8,623,463; 8,664,286; and 8,877,848; U.S. Patent Appl. Publ. Nos. 2007/0049697; 2007/0197713; 2009/0286933; 2012/0043493; and 2015/0097136. These specialized resin supports may include styrenic and acrylic monomers including acidic groups for water dispersability with number average molecular weights below about 50,000 g/mol. Deprotonation of the acrylic acid moieties may allow for dissolution or dispersion of the oligomers in water. These dispersed resins can then be used as electrosteric surfactants in emulsion polymerization resulting in emulsions with unique properties. The resulting materials may display Newtonian shear behavior over a wide range of shear rates. Additionally, the acid content of the resin support may improve the interaction of the emulsion polymer with formulation additives, specifically pigments. It has been found that select resin supported emulsions perform exceedingly well as binders for LASD formulations.

The use of a resin support instead of a typical surfactant imparts an improved resistance to water uptake. In high humidity conditions traditional LASD products absorb waters due to high surfactant levels which plasticizes the material and reduces the damping performance. Additionally, poor water resistance limits the locations where LASD can be applied in a vehicle, such as near windows. The absorption of water also adds weight to the vehicle which is counter to the goal of using these materials to ultimately decrease the weight of the vehicle to improve fuel efficiency. The damping performance of an LASD material is temperature dependent and is related to the glass transition temperature ($T_g$) of the viscoelastic binder. With a lower glass transition temperature binder the temperature of maximum damping will also move to lower temperature.

Since effective damping, especially for automobiles, is desired at a wide range of temperature from a cold winter to a hot summer day, a blend of binders of different glass transition temperatures ($T_g$) are often used to broaden the damping temperature profile. For the resin supported emulsions described in this invention, the resin support has a significantly higher Tg than the bulk polymer and this results in a broader damping temperature profile which can reduce the number of binders which are needed to achieve the required damping profile.

According to one embodiment, a method of damping mechanical vibration may involve applying on a source of mechanical vibrations a formulation including an aqueous polymer emulsion prepared by an emulsion polymerization reaction of at least one emulsion-polymerizable monomer including monomers and a support resin.

In some embodiments, the support resin may include a low molecular weight copolymer. For example, the support resin may have a number average molecular weight from about 1,000 g/mol to about 75,000 g/mol. This may include a number average molecular weight from about 1,000 g/mol to about 65,000 g/mol or from about 1,000 g/mol to about 50,000 g/mol or from about 1,000 g/mol to about 30,000 g/mol or from about 1,000 g/mol to about 20,000 g/mol, or from about 1,000 g/mol to about 15,000 g/mol, or from about 1,000 g/mol to about 10,000 g/mol.

In some embodiments, the low molecular weight copolymer may have a weight average molecular weight from about 1,500 g/mol to about 35,000 g/mol. This includes a weight average molecular weight from about 4,000 g/mol to about 25,000 g/mol.

In some embodiments, the low molecular weight copolymer may be a copolymer of acrylic acid and styrene.

Suitable monomers employed in the preparation of the support resin, which may be a low molecular weight copolymer, include acrylic acid, methacrylic acid, styrene, alpha-methylstyrene, hydroxyethylmethacrylate, hydroxyethylacrylate, and esters of acrylic acid and methacrylic acid.

In some embodiments, a support resin, such as a low molecular weight copolymer, may be a carboxylic acid-functional support resin. In some embodiments, the carboxylic acid-functional support resin may be an alkali soluble resin. In other words, the carboxylic acid-functional support resin may react with alkali materials to form ion salts at the carboxylate groups of the polymer, thereby enhancing the water solubility characteristics of the resin. Suitable monomers for preparation of the carboxylic acid-functional support resin and the low molecular weight copolymer include monomers such as acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, vinyl chloride, or mixtures of any two or more such monomers. In some embodiments, the carboxylic acid-functional support resin includes polymerized monomers of one or more of ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, or mixtures of any two or more such monomers. In one embodiment, the carboxylic acid-functional support resin includes polymerized monomers of one or more acrylic acid, ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, styrene, methyl styrene, alpha-methyl styrene, diacetone acrylamide, ureido methacrylate, or a mixture of any two or more such monomers. In some embodiments, the carboxylic acid-functional support resin may include a co-polymer including two or more of styrene, methyl methacrylate, and acrylic acid. In some embodiments, the carboxylic acid-functional support resin may include a copolymer of acrylic acid and styrene.

The support resin, such as a low molecular weight copolymer, may exhibit a glass temperature ($T_g$) from 0 to 130° C. or from 30° C. to 110° C. or any subrange or value within these ranges.

The support resin, such as a low molecular weight copolymer, may have an acid number from 20 to 300 or from 25 to 250 or any subrange or value within these ranges. The support resin, such as a low molecular weight copolymer, may have a degree of neutralization from about 10% to about 110% or any subrange or value within this range.

Emulsion-polymerizable monomers are known in the art, see e.g. U.S. Pat. Nos. 4,820,762; 7,253,218; 7,893,149; and U.S. Patent Publication No. 2015/0166803.

The emulsion polymerizable monomer may include an ethylenically unsaturated monomer. In some embodiments, emulsion polymerizable monomer may include at least one ethylenically unsaturated nonionic monomer. By "nonionic monomer" herein is meant that the copolymerized monomer residue does not bear an ionic charge between pH 1 and 14. Suitable ethylenically unsaturated nonionic monomers include, but are not limited to, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; ureido-functional monomers; monomers bearing acetoacetate-functional groups; styrene and substituted styrenes; butadiene; ethylene, propylene, .alpha.-olefins such as 1-decene; vinyl acetate, vinyl butyrate and other vinyl esters; and vinyl monomers such as vinyl chloride, vinylidene chloride.

The emulsion-polymerizable monomer may include acrylate monomers, methacrylate monomers, styrene monomers, or a mixture of any two or more thereof. In some embodiments, the emulsion polymerizable monomer does not include styrene monomers.

In some embodiments, the at least one emulsion polymerizable monomer may be a $C_1$-$C_4$ acrylate, a $C_1$-$C_4$ (meth) acrylate, or a mixture of any two or more thereof. In some embodiments, the emulsion-polymerizable monomer may be n-butyl acrylate, 2-ethylhexyl acrylate, methyl acrylate, methyl methacrylate, styrene, ethyl acrylate, or a mixture of any two or more thereof.

In some embodiments, the emulsion polymerizable polymer may include one or more keto-functional monomers. Examples of keto-functional monomers include diacetone acrylamide, diacetone methacrylamide, diacetone acrylate, diacetone methacrylate, acetoacetoxymethyl (meth)acrylate, 2-(acetoacetoxy)ethyl (meth) acrylate, 2-acetoacetoxypropyl(meth)acrylate, butanediol-1,4-acrylate-acetylacetate, vinyl methyl ketone, vinyl ethyl ketone, and vinyl isobutyl ketone, allyl acetoacetate, vinyl acetoacetate, or vinyl acetoacetamide. In one embodiment, the emulsion polymerizable polymer includes a repeat unit derived from diacetone acrylamide.

In some embodiments, the weight ratio between the emulsion polymerizable monomer and the support resin, such as a low molecular weight copolymer, during emulsion polymerization may be from about 1:1 to about 100:1, or from about 1:1 to about 50:1, or from about 1:1 to about 20:1, or any subrange or value within these ranges.

In some embodiments, the at least one emulsion polymerizable monomer and the support resin, such as a low molecular weight copolymer, are included from about 30 wt % to about 70 wt %, or from about 40 wt % to about 60 wt %, or any subrange or value within these ranges, based upon the total ingredients used in the emulsion polymerization reaction.

The emulsion polymerization reaction besides the at least one emulsion polymerizable monomer and the low molecular weight copolymer, may also involve other ingredients and/or reagents, such as for example, an initiator.

The initiator may be a water-soluble compound for ready mixing and blending with the emulsions. Non-limiting examples of water-soluble initiators for the emulsion polymerization include ammonium salts and alkali metal salts of peroxydisulfuric acid, e.g., sodium peroxodisulfate, hydrogen peroxide or organic peroxides, e.g., tert-butyl hydroperoxide. The initiator may be a thermal initiator. Suitable initiators include, but are not limited to 2,2'-azobis(2-methylpropionamidine)dihydrochloride, ammonium persulfate, sodium persulfate, and potassium persulfate. Also suitable are reduction-oxidation (redox) initiator systems. The redox initiator systems consist of at least one, usually inorganic, reducing agent and an organic or inorganic oxidizing agent. The oxidizing component comprises, for example, the emulsion polymerization initiators already identified above. The reducing components comprise, for example, alkali metal salts of sulfurous acid, such as, for example sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1% to 30% by weight, preferably 0.5% to 20% by weight, more preferably 1.0% to 10% by weight, based on the solution. The amount of the initiators is generally 0.1% to 10% by weight, preferably 0.5% to 5% by weight, based on the monomers to be polymerized. It is also possible for two or more different initiators to be used in the emulsion polymerization.

In some embodiments, an initiator may be ammonium persulfate and an oxidizer may be t-butyl hydroperoxide. In such case, a weight ratio between ammonium persulfate and t-butyl hydroperoxide may range from 40:1 to 2:1 or from 30:1 to 4:1 or any subrange or value within these ranges. In some embodiments, a reducing agent may be used in conjunction with the t-butyl hydroperoxide. Non-limiting examples of a reducing agent include sodium erythorbate, ascorbic acid, and/or sodium metabisulfite.

In some embodiments, the damping formulation may include at least one of a filler, a defoaming agent, a rheological modifier, a emulsifying agent (i.e. "dispersing agent" or "dispersant"), a coalescent agent, a pigment, or a biocide.

In some embodiments, the damping formulation may include one or more fillers, which may constitute from about 40 wt % to about 90 wt % or from 45 wt % to 85 wt % or from 50 wt % to 80 wt % or any value or subrange within these ranges of the formulations. Examples of fillers may include, but are not limited to, calcium carbonate, barium sulfate, glass filler, magnesium carbonate, plastic microspheres, mica, powdered slate, montmorillonite flakes, glass flakes, metal flakes, graphite, graphene, talc, iron oxide, clay minerals, cellulose fibers, mineral fibers, carbon fibers, glass or polymeric fibers or beads, ferrite, calcium carbonate, calcium magnesium carbonate, calcium silicate, barytes, ground natural or synthetic rubber, silica, aluminum hydroxide, alumina and mixtures thereof. In some embodiments, the damping formulation may include a mixture of any two or more such fillers and the damping formulations may include either virgin material of any of the foregoing, or reclaimed or spent material. In some embodiments, the filler includes virgin calcium carbonate, spent calcium carbonate, or a mixture thereof.

In some embodiments, the damping formulation may include a defoaming agent (a defoamer). Examples of defoaming agents include Foamaster® S (produced by BASF), Rhodoline® DF 540 (produced by Solvay), Rhodoline® 635 (produced by Solvay), Foamaster® MO 2170 (produced by BASF), or Foamaster® MO 2190 (produced by BASF). The damping formulation may include as much of a defoaming agent as needed to provide the desired foaming characteristics. In some embodiments, the defoaming agent may constitute less than 1 wt % of the damping formulation. In some embodiments, the damping formulation more than 0 wt % up to about 1 wt % of the defoaming agent.

In some embodiments, the damping formulation may include a thickener or a rheological modifier. Examples of rheological modifiers include Rheovis® HS 1152; Rheovis® HD 1152 (produced by BASF) or Rheovis® AS 1130 (produced by BASF). The damping formulation may include as much of a rheological modifier as needed to provide the desired solution characteristics. In some embodiments, the formulation may include less than 1 wt % of the rheological modifier. In other embodiments, the formulation may include more than 0 wt % up to about 1 wt % of the rheological modifier.

In some embodiments, the damping formulation includes a dispersant. One non-limiting example of a dispersant is Dispex® CX 4320 (produced by BASF). The damping formulation may include as much dispersant as need to provide the desired characteristics for the formulation. In some embodiments, the formulation may include from 0.1 to 2.0 wt % or from 0.25 to 1.5 wt % or from 0.5 to 1.0 wt % or any value or subrange within these ranges.

In some embodiments, the damping formulation may include a biocide. Suitable non-limiting examples of a biocide include Acticide® MBS (a mixture of 1,2-benzisothiazolin-3-one (2.5%) and 2-methyl-4-isothiazolin-3-one (2.5%)), Acticide® MV-14 (a mixture of 5-chloro-2-methyl-2H-isothiazol-3-one and 2-methyl-2H-isothiazol-3-one in a ratio of 3:1 respectively), and Acticide® CEM 2 (a mixture of 1,2-benzisothiazol-3(2H)-one (9.3-10.7%), 2-methylisothiazol-3(2H)-one (4.7-5.2%), and 5-chloro-2-methyl-2H-isothiazol-3-one (0.9-1.1%).

In some embodiments, the damping formulation may be deposited on a surface of the source of mechanical vibrations in a form of a layer. Such a layer may have a thickness ranging from 0.5 mm to 12 mm or from 0.5 mm to 10 mm or from 1.0 mm to 10 mm or from 1.5 mm to 8 mm or from 2 mm to 6 mm or any value or subrange within these ranges.

The damping formulation may be deposited on a source of mechanical vibrations by a number of ways. For example, in some embodiments, the damping formulation may be sprayed on a source of mechanical vibrations. Yet in some embodiments, the damping formulation may be painted on a source of mechanical vibrations.

A source of mechanical vibration may be a body, which is capable of producing or transmitting vibrations. The LASD formulations disclosed herein can be applied to a variety of bodies capable of producing or transmitting vibrations. Non-limiting examples of such bodies include an auto interior cabin; pickup truck interior cabin and underside of truck bed; interior panels of trucks; automobile interior cabin and underside of automobile; interior panels of automobiles; walls, ceilings, and floors of rail cars; elevators; washing machines; clothes driers; automatic dishwashers; and the underside of sinks.

The damping formulations provided herein may also be applied to a variety of materials, including, for example, metal, steel, aluminum, plastic, wood, wallboard, or gypsum board.

In some embodiments, the damping formulations may be used, for example, for damping mechanical vibrations for frequencies from 10 Hz to 10000 Hz or from 20 Hz to 2000 Hz or from 20 Hz to 1000 Hz or any value or subrange within these ranges.

The damping formulation may have a viscosity at 25° C. ranging from 30,000 cPs to 120,000 cPs or from 40,000 to 100,000 cPs or any value or subrange within these ranges.

The present inventors also developed a damping formulation, which has a broad damping profile. Such broad damping profile is presented, for example, in FIG. 1.

The present inventors also developed a formulation including an aqueous polymer emulsion prepared by an emulsion polymerization reaction of at least one emulsion-polymerizable monomer and a support resin including a low molecular weight copolymer, where the at least one emulsion-polymerizable monomer includes a) 20 to 90 wt % of at least one of n-butyl acrylate and ethyl acrylate and b) 10 to 80 wt % of methyl methacrylate. In some embodiments, the at least one emulsion-polymerizable monomer may include a) 20-80 wt % or 30-70 wt % or 40-60 wt % or any subrange or value within these ranges of n-butyl acrylate and b) 20-80 wt % or 30-70 wt % or 40-60 wt % or any subrange or value within these ranges of methyl methacrylate. In some embodiments, the at least one emulsion-polymerizable monomer may include a) 30-90 wt % or 35-85 wt % or 40-80 wt % or any subrange or value within these ranges of ethyl acrylate and b) 10-70 wt % or 15-65 wt % or 20-60 wt % or any subrange or value within these ranges of methyl methacrylate.

Although the above polymer bearing compositions may include materials such as virgin or reclaimed alkaline metal carbonates, where the reclaimed alkaline metal carbonates are used, the polymeric composition may be much broader that the specific materials described above. Accordingly, in another aspect, a waterborne, liquid-applied sound damping composition may include a polymeric resin; and reclaimed alkaline earth metal carbonate particles. The use of reclaimed alkaline earth metal carbonates in the sound damping compsitions are shown in the examples to provide unexpected improvement in sound dampling over the use of virgin materials. For example, such compositions that include the reclaimed alkaline metal carbonates, such as reclaimed calcium carbonate, may exhibit a sound damping property as measured by a composite loss factor of from about 0.13 to about 0.4 at a frequency of 200 Hz and at a temperature of from about 20° C. to about 30° C. The corresponding virgin calcium carbonate samples are substantially below this range.

The reclaimed calcium carbonate may be a reclaimed filter aid from paint applications. "Filter aid," as used herein, includes ground alkaline earth metal carbonates suitable for use in overspray paint applications. Non-limiting examples of suitable alkaline earth metal carbonates include calcium carbonate. Preferably, the filter aid includes calcium carbonate particles that are prepared from high purity calcium carbonate, particularly calcium carbonate of sedimentary origin, that is characterized as readily breaking into fine particles. Non-limiting examples of calcium carbonates which are of sedimentary origin includes oolites, petroids, chalks, limestones, and marbles of both calcitic and aragonitic crystal forms. The Filter aid adsorbs the paint overspray and becomes saturated, causing the paint-saturated filter aid to agglomerate, decreasing the effective surface area of the paint-saturated filter aid, and rendering the paint-saturated filter aid too large to be readily fluidized. The paint-saturated filter aid is blown off the filter element, removed from the filtering system, and collected and converted into a form suitable for reuse.

The filter aid generally is in the form of fine particles having a high surface area. For example, prior to its use, the particles of filter aid have a median particle size (D50) of about 1 to 44 microns, preferably from about 8 to about 25 microns. The particles of filter aid may be further characterized as having one or more of the following properties: a D90 from about 20 to about 90 microns; a chemical purity level of greater than about 90% by weight alkaline earth metal carbonate (preferably greater than about 90% by weight calcium carbonate); and a moisture level of less than about 0.2% by weight.

The "paint-saturated filter aid", as used herein, refers to particles of filter aid to which the paint overspray has adsorbed. The paint-saturated filter aid may be characterized by one or more of the following properties: the relative effective surface area of the particles of paint-saturated filter aid (i.e., as compared to the starting relative effective surface area of the particles of filter aid), the median particle size, D50, of the particles of paint-saturated filter aid, or the moisture content or paint content of the particles of paint-saturated filter aid.

In certain embodiments, the particles of paint-saturated filter aid may have an effective surface area less than about 50% of the starting effective surface area of the particles of filter aid, less than about 35% of the starting effective surface area of the particles of filter aid, or less than 20% of the starting effective surface area of the particles of filter aid. In some embodiments, the particles of paint-saturated filter aid have a median particle size (D50) from about 40 to about 100 microns, from about 40 to about 80 microns, or from about 40 to about 70 microns. In embodiments, the particles of paint-saturated filter aid may have a moisture level of greater than about 0.3% by weight. In embodiments, the particles of paint-saturated filter aid may have a paint content from about 1 to about 5% by weight.

The paint-saturated filter aid is processed to make it suitable for reuse by re-milling the paint-saturated filter aid to produce recycled alkaline earth metal carbonate particles of a predetermined size. Methods of re-milling include methods known in the art for drying and reducing the size of particles, non-limiting examples of which include roller mills, hammer mills, impact mills, centrifugal mills, jet mills, media mills, and the like.

The paint-saturated filter aid may be recycled alone or co-milled in combination with one or more other filler materials. For example, in embodiments the re-milling comprises blending and co-milling the paint-saturated filter aid with a virgin or post-industrial alkaline earth metal carbonate. In embodiments, the re-milling comprises blending and co-milling the paint-saturated filter aid with a virgin calcium carbonate, a post-industrial calcium carbonate, or a combination thereof. The recycled alkaline earth metal carbonate particles also may be combined with one or more other materials after re-milling the paint-saturated filter aid to provide a composite material. However, it is believed that blending and co-milling the paint-saturated filter aid with one or more other materials is particularly effective because it provides additional surface area onto which the thicker paint films in the paint-saturated filter aid can be spread by the shear of the re-milling, thereby improving the functionality of the resulting recycled alkaline earth metal carbonate particles.

In another embodiment, the paint-saturated filter aid and one or more other filler materials may be combined at a ratio from about 1:100 to about 100:1, from about 1:50 to about 50:1, from about 1:25 to about 25:1, from about 1:10 to about 10:1, from about 1:5 to about 5:1, from about 2:3 to about 3:2, or about 1:1. For example, in embodiments the paint-saturated filter aid is present from about 1% to about 100% by weight of the recycled alkaline earth metal carbonate particles or composite material, from about 20% to about 80% by weight of the recycled alkaline earth metal carbonate particles or composite material, from about 25% to about 75% by weight of the recycled alkaline earth metal carbonate particles or composite material, or from about 40% to about 60% by weight of the recycled alkaline earth metal carbonate particles or composite material.

Examples of fillers materials include, but are not limited to mineral fillers such as ground and precipitated calcium carbonate, kaolin, calcined, delaminated and structured clay, titanium dioxide, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate and calcium sulfate, and combinations of these materials. Fillers useful in this invention can also include various non-coalescing (at least at the temperatures of use) polymeric plastic fillers including, but not limited to solid bead, voided, multivoided, binder-coated, charged, etc. and their combinations. Preferably, the filler used in this invention comprises calcium carbonate and/or mica. Calcium carbonate can be ground-type (GCC) or precipitated-type (PCC) of varying particle size, shape and morphologies.

The recycled alkaline earth metal carbonate particles may be characterized by one or more of the following properties: the median particle size (D50) of the recycled alkaline earth metal carbonate particles, the top cut size (D90) of the recycled alkaline earth metal carbonate particles, or the amount of recycled alkaline earth metal carbonate particles retained on a mesh screen. In some embodiments, the recycled alkaline earth metal carbonate particles have a median particle size (D50) of about 1 to about 50 microns, about 1 to about 25 microns, about 5 to about 25 microns, about 5 to about 20 microns or about 5 to about 15 microns. In some embodiments, less than about 50% of the recycled alkaline earth metal carbonate particles are retained on a 200 mesh screen, less than about 25% of the recycled alkaline earth metal carbonate particles are retained on a 200 mesh screen, or less than 5% of the recycled alkaline earth metal carbonate particles are retained on a 200 mesh screen. In embodiments, the recycled alkaline earth metal carbonate particles have a top cut size (D90) of about 5 to about 300 microns, about 10 to about 200 microns, or about 15 to about 100 microns.

The recycled alkaline earth metal carbonate particles also may be characterized by the moisture or paint content of the recycled alkaline earth metal carbonate particles. For example, the recycled alkaline earth metal carbonate particles may have a moisture content of less than or equal to about 0.2% by weight or a paint content of about 1 to about 5% by weight.

The recycled alkaline earth metal carbonate particles are suitable for reuse in a variety of applications that do not require the whiteness usually obtained when using ground alkaline earth metal carbonates, such as calcium carbonate. For example, the recycled alkaline earth metal carbonate particles may be used in various liquid applied sound damping applications. The instant liquid applied sound damping compositions may additionally comprise one or more pigments.

A pigment or combination of pigments can also be used in the composition of the invention to provide color. Among other properties, pigments can also be used to increase the solids content of the compositions and perform the function of a filler. Generally, any alkali stable inorganic or organic pigment can be used in the compositions of the present invention. Examples of useful pigments in the present invention include carbon black dispersions. Commercially available pigments include Aurasperse from BASF Corporation; and Tint Ayd from Chromaflo Technologies. Preferably, it is present in an amount of from about 0.2% to about 5.0% by weight, based on the total weight of the composition.

In an illustrative embodiment, the recycled alkaline earth metal carbonate particles are used in the manufacture of liquid applied sound damping applications to satisfy the increasing desire to incorporate recycled content into articles of manufacture. For example, initiatives including the U.S. Green Building Council's Leadership in Energy and Environmental Design® (LEED) promote the use of recycled content in construction products. Accordingly, the recycled alkaline earth metal carbonate particles may be present in the liquid sound applied damping compositions in order to qualify for at least one point towards certification under standards set by Leadership in Energy and Environmental Design® or NSF Standard 140.

In another embodiment, the paint-saturated filter aid and one or more other filler materials may be combined at a ratio from about 1:100 to about 100:1, from about 1:50 to about 50:1, from about 1:25 to about 25:1, from about 1:10 to about 10:1, from about 1:5 to about 5:1, from about 2:3 to about 3:2, or about 1:1. For example, in embodiments the paint-saturated filter aid is present from about 1% to about 100% by weight of the recycled alkaline earth metal carbonate particles or composite material, from about 20% to about 80% by weight of the recycled alkaline earth metal carbonate particles or composite material, from about 25% to about 75% by weight of the recycled alkaline earth metal carbonate particles or composite material, or from about 40% to about 60% by weight of the recycled alkaline earth metal carbonate particles or composite material.

In another embodiment, a liquid applied sound damping composition is provided comprising a mixture of recycled alkaline earth metal carbonate particles wherein the recycled particles are comprised of a mixture of a paint saturated filter aid and other filler materials. For example, in embodiments the paint-saturated filter aid is present from about 1% to about 100% by weight of the recycled alkaline earth metal carbonate particles or composite material, from about 20% to about 80% by weight of the recycled alkaline earth metal carbonate particles or composite material, from about 25% to about 75% by weight of the recycled alkaline earth metal carbonate particles or composite material, or from about 40% to about 60% by weight of the recycled alkaline earth metal carbonate particles or composite material.

In another embodiment, a liquid applied sound damping composition is provided comprising recycled alkaline earth metal carbonate particles present from about 5 wt % to about 80 wt %, recycled alkaline earth metal carbonate particles present from about 15 wt % to about 70 wt %, recycled alkaline earth metal carbonate particles present from about 25 wt % to about 70 wt %, recycled alkaline earth metal carbonate particles present from about 40 wt % to about 70 wt %, and recycled alkaline earth metal carbonate particles present from about 50 wt % to about 65 wt %.

The polymers or polymeric resins described herein can include acrylic polymers, styrene-acrylic copolymers, styrene-butadiene copolymers, vinyl-acrylic copolymers, or mixtures thereof. In some embodiments, the copolymer can be a straight acrylic copolymer derived from monomers including (meth)acrylic acid, (meth)acrylic acid esters, (meth)acrylamide, (meth)acrylonitrile, and mixtures thereof. For example, the straight acrylic copolymer can include at least one of (meth)acrylic acid, itaconic acid, methyl(meth) acrylate, ethyl(meth)acrylate, n-butyl(meth)acrylate, isobutyl(meth)acrylate, tert-butyl (meth)acrylate, 2-ethylhexyl(meth)acrylate, (meth)acrylamide, (meth)acrylonitrile, hydroxypropyl(meth)acrylate, hydroxyethyl(meth)acrylate and diacetone-acrylamide. The straight acrylic copolymer can include from 77% to 99% by weight of (meth)acrylates, 0 to 3% by weight of (meth)acrylamide, and 0 to 10% by weight of (meth)acrylonitrile. The styrene acrylic copolymer can also include from 0 to 5% by weight of one or more functional monomers. In some embodiments, the straight acrylic polymer can include butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a styrene acrylic copolymer derived from monomers including styrene, (meth)acrylic acid, (meth)acrylic acid esters, (meth) acrylamide, (meth)acrylonitrile, and mixtures thereof. For example, the styrene acrylic copolymer can include styrene and at least one of (meth)acrylic acid, itaconic acid, methyl (meth)acrylate, ethyl(meth)acrylate, n-butyl(meth)acrylate, isobutyl(meth)acrylate, tert-butyl(meth)acrylate, 2-ethylhexyl(meth)acrylate, (meth)acrylamide, (meth)acrylonitrile, hydroxypropyl(meth)acrylate, hydroxyethyl(meth)acrylate, and diacetone-acrylamide. The styrene acrylic copolymer can include from 39 to 69% by weight of (meth)acrylates, from 30 to 60% by weight of styrene, from 0 to 3% by weight of (meth)acrylamide, and from 0 to 10% by weight of (meth)acrylonitrile. The styrene acrylic copolymer can also include from 0 to 5% by weight of one or more functional monomers. In some embodiments, the styrene acrylic polymer can include styrene, butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a vinyl acrylic copolymer derived from monomers including vinyl acetate, (meth)acrylic acid, (meth)acrylic acid esters, (meth)acrylamide, (meth)acrylonitrile, and mixtures thereof. For example, the vinyl acrylic copolymer can include vinyl acetate and at least one of (meth)acrylic acid, itaconic acid, methyl(meth)acrylate, ethyl (meth)acrylate, n-butyl(meth) acrylate, isobutyl(meth)acrylate, tert-butyl(meth)acrylate, 2-ethylhexyl(meth)acrylate, (meth)acrylamide, (meth)acrylonitrile, hydroxypropyl(meth)acrylate, hydroxyethyl(meth) acrylate, and diacetone-acrylamide. The vinyl acrylic copolymer can include from 39 to 69% by weight of (meth)acrylates, from 30 to 60% by weight of vinyl acetate, 0 to 3% by weight of (meth)acrylamide, and 0 to 10% by weight of (meth)acrylonitrile. The vinyl acrylic copolymer can also include from 0 to 5% by weight of one or more functional monomers. In some embodiments, the vinyl acrylic polymer can include vinyl acetate, butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a styrene butadiene copolymer derived from monomers including styrene, butadiene, (meth)acrylamide, (meth)acrylonitrile, itaconic acid, and (meth)acrylic acid. The styrene butadiene copolymer can include from 40 to 75% by weight of styrene, from 25 to 60% by weight of butadiene, 1 to 10% of itaconic and/or (meth)acrylic acid, 0 to 3% by weight of (meth) acrylamide, and 0 to 20% by weight (meth)acrylonitrile.

In some embodiments, the polymers can be derived from at least 60% of one or more (meth)acrylates. For example, the polymers can be derived from at least 65%, at least 70%, at least 75%, at least 80%, at least 85%, at least 90%, at least 95%, or at least 99% of a (meth)acrylate. The polymers can be straight acrylics, vinyl acrylics or styrene acrylics, for example. Examples of (meth)acrylates include butyl acrylate, 2-ethylhexyl acrylate, ethyl acrylate, methyl methacrylate, and methyl acrylate. The polymers described herein can include one or more functional monomers. Examples of suitable functional monomers include acrylic acid, methacrylic acid, vinylsulfonic acid, itaconic acid, hydroxyethyl (meth)acrylate, hydroxypropyl(meth)acrylate and diacetone-acrylamide. The polymers can also be derived from other monomers such as styrene, (meth)acrylonitrile, (meth) acrylamide, vinyl acetate, or mixtures of these.

In some embodiments, the composition further includes a pH buffer (e.g., an alkaline pH buffer). The polymer may include, an acrylic polymer, a styrene-acrylic copolymer, a styrene-butadiene copolymer, a vinyl-acrylic copolymer, or a mixture of any two or more thereof. In some examples, the polymer is derived from at least 60% of a (meth)acrylate selected from the group consisting of butyl acrylate, 2-ethylhexyl acrylate, ethyl acrylate, methyl methacrylate, and methyl acrylate. For example, the polymer can be derived from at least 80% of a (meth)acrylate selected from the group consisting of butyl acrylate, 2-ethylhexyl acrylate, ethyl acrylate, methyl methacrylate, and methyl acrylate. The polymers of the compositions described herein can be further derived from one or more functional monomers, including, for example, acrylic acid, methacrylic acid, vinylsulfonic acid, itaconic acid, hydroxyethyl(meth)acrylate, hydroxypropyl(meth)acrylate, diacetone-acrylamide or mixtures thereof. In some examples, the polymer is further derived from styrene, (meth)acrylonitrile, (meth)acrylamide, vinyl acetate, or mixtures thereof.

The polymeric resin is present in the instant composition of the invention, in an amount from about 5 wt % to about 80 wt %, from about 10 wt % to about 70 wt %, from about 10 wt % to about 60 wt %, from about 15 wt % to about 50 wt %, and from about 20 wt % to about 40 wt %.

The composition may be prepared by mixing the ingredients until a uniformly dispersed mixture is obtained. Any conventional mixing techniques can be used. The resultant composition is storage stable. That is, it can be stored for up to about 60 to about 90 days at about 60° F. to about 80° F. without significant separation and agglomeration of the ingredients. The composition of the invention can be applied to a surface of a suitable substrate using any conventional coating technique, such as spray coating or brushing.

The instant invention relates to a method of improving the sound damping property of a substrate. The method comprises a step of applying the sound damping composition of the invention to at least one surface of the substrate to form a coating thereon. Preferably, the coating is dried at ambient conditions for a period sufficient to dry the coating, preferably for about 72 hours. Alternatively, the coating can be dried at a low temperature, e.g, up to 200° F. for a period sufficient to dry the coating.

In yet another aspect, the invention provides an article comprising a substrate and a coating of the above-described composition disposed thereon. The useful substrate include steel, aluminum, sheet molding compound (SMC), fiber glass and other plastics. The article can be used in vehicles, such as cars, trucks or boats, appliances or other suitable structures that are subject to noises resulting from structural vibrations and air borne.

In general, the article of the invention finds application in the quarter panels, the roof, the door, the interior, the floor pan, and the wheel house of motor vehicles. In other applications, the article can be placed in a suitable position on the inside or outside of a structure e.g., a vehicle or an aircraft to provide maximum sound damping performance.

The compositions can also be formulated to be light weight, i.e. the specific gravity of the composition ranges from about 1.0 to about 1.5.

Although the composition of the invention is a waterborne composition, it can also include minor amount of organic solvents. For example, it can include solvents that act as film enhancers, i.e., that improve the flowability of polymer emulsion particles such that the emulsion more readily forms a film. Useful film enhancers include alcohols, ester alcohols and glycol ethers. Preferably, a film enhancer is present in an amount sufficient to impart advantageous film-forming characteristics to the compositions of the present invention.

The alcohol solvent should have at least one pendant hydroxyl group, to help provide improved flow and dispersibility. Propylene glycol is used in the examples below. It has been found that about 0.01 to about 5 wt. % works well. The concentration of propylene glycol the total formulation may be varied from about 0.01 wt. % to about 4 wt. %, more typically about 0.1 wt % to about 3 wt. % and most typically about 0.50 wt. % to about 2 wt. %. Note that other alcohol solvents may be used instead of propylene glycol. Other alcohol solvents are selected from the group consisting of n-butanol, sec-butanol, tert-butanol, 2-ethoxyethanol, propylene glycol, propylene glycol monoethyl ether, propylene glycol monopropyl ether, diethylene glycol monomethyl ether, ethylene glycol monobutyl ether, ethylene glycol monomethyl ether, ethylene glycol monopropyl ether, diethylene glycol monoethyl ether, diethylene glycol monobutyl ether, tripropylene glycol monomethyl ether and mixtures thereof.

The composition of the invention may include other optional ingredients such as additives typically used in the waterborne paint and adhesive compositions to further customize the composition. These ingredients are generally used in the amounts that do not adversely alter the desirable properties of the composition and may further depend on the end use of the composition. Examples of useful additives include thickeners, dispersants, surfactants, defoamers, preservatives, plasticizers, antifreeze, pH modifiers, and coalescing solvent. Although these ingredients used in the invention may be characterized as useful for specific functions, it should be understood that these ingredients are not limited to their typical functions and thus will be used generally in the invention to provide desirable properties to the composition.

In some such embodiments, the polymeric resin may include an acrylic polymer, n-butyl acrylate-acrylonitrile-styrene copolymer, styrene-acrylic copolymer, styrene-butadiene copolymer, vinyl-acrylic copolymer, or a mixture of any two or more thereof. In one illustrative embodiment, the polymeric resin includes n-butyl acrylate-acrylonitrile-styrene copolymer.

In the compositions, the polymeric resin may be present at about 5 wt % to about 80 wt %. This may include, but is not limited to about 10 wt % to about 70 wt %; about 10 wt % to about 60 wt %; about 15 wt % to about 50 wt %; or about 20 wt % to about 40 wt %.

In the compositions, the reclaimed alkaline earth metal carbonate particles may be present from about 5 wt % to about 80 wt %. This may include, but is not limited to, from about 15 wt % to about 70 wt %; from about 25 wt % to about 70 wt %; from about 40 wt % to about 70 wt %; or from about 50 wt % to about 65 wt %.

The reclaimed alkaline earth metal carbonate particles is recovered calcium carbonate from paint saturated filter aid, according to any of the embodiments in this aspect.

According to the embodiments, the recycled alkaline earth metal carbonate particles may have a median particle size (D50) of about 1 to about 50 microns. This includes D50 values from about 1 to about 25 microns; about 5 to about 20 microns; or about 5 to about 15 microns.

According to the embodiments, the recycled alkaline earth metal carbonate particles are present as a mixture of recycled alkaline earth metal carbonate particles and other filler materials. Illustrative other filler materials include, but are not limited to, graphite, kaolin, calcined clay, delaminated clay, structured clay, titanium dioxide, aluminum silicate, magnesium silicate, wollastonite, zinc oxide, iron oxide, magnesium carbonate, amorphous silica, zinc hydroxide, aluminum oxide, aluminum hydroxide, talc, satin white, barium sulfate, calcium sulfate, polymeric plastic fillers, and combinations of any two or more thereof.

The present disclosure, thus generally described, will be understood more readily by reference to the following examples, which are provided by way of illustration and are not intended to be limiting of the present invention.

EXAMPLES

The following abbreviations and terms are used herein:
Dispex® CX 4230 is a low VOC hydrophobic dispersant, available from BASF;
Lumiten ISC is a diethylhexyl ester of sulfosuccinic acid-based wetting agent, available from BASF;
Disponil AFX 4030 is a modified fatty alcohol polyglycolether-based emulsifier, available from BASF;
Pluronic F-87 is a nonionic, difunctional block copolymer surfactant terminating in primary hydroxyl groups-type surfactant, available from BASF;
GPR200 is virgin calcium carbonate with a mean particle size of 12 microns, available from R.E. Carroll, Inc.;
Suzorite 80-SF is a phlogopite-based mica with 50 micron average particle size, available from Imerys;
Attagel 40 is an inert powdered gelling grade of attapulgite, available from BASF;
Foamaster MO 2190 (WPA) is a mineral oil based blend of silica derivatives and organic hydrophobes;
Propylene glycol is available from Aldrich Chemical Company; and
Acronal S504 is a waterborne acrylic dispersion containing an n-butyl acrylate-acrylonitrile-styrene copolymer with about 50 weight % solids.

General.

Resin Supported Emulsions. Traditional emulsion polymerization relies on the use of small molecule surfactants containing a polar/hydrophilic group and a nonpolar/hydrophobic group. The amphiphilic nature of these materials allows them to effectively stabilize heterogeneous solutions (i.e. polymer particles in water). Although this stabilization approach is the most widely used in industrial emulsion synthesis, several other methods exist for emulsion polymer stabilization. One such stabilization method, known as electrosteric, combines the concepts of electrostatic (based on charged states) and steric (based on space molecules occupy) stabilization. Upon neutralization, acid-containing styrene acrylic resins are dissolved or dispersed in water, and these dispersed resins are then used in emulsion polymerization.

Liquid Applied Sound Damping (LASD). Sound is a pressure wave transmitted through a fluid medium (e.g. air, water, etc.). Vibrations are similar waves transmitted through solid objects. Damping is the process of dissipating the vibrational energy by transforming it into heat. The automotive industry is interested in damping technology as the push to lighter more fuel efficient vehicles requires thinner gauge metal parts for the body, resulting in increased vibrations throughout the vehicle. These vibrations, if left unchecked, can cause mechanical fatigue, up to and including, mechanical failure. In addition, the vibrations generate low frequency sound in the vehicle interior which can be bothersome to inhabitants, contribute to driver fatigue, and create an adverse perception of the vehicle construction quality.

The automotive industry has long acknowledged the importance of damping and has utilized several technologies to achieve it. Historically, one of these technologies relied on the application of asphaltic (i.e. bitumen) pads to the car body in the paint shop. This approach achieves reasonable damping, but suffers from several drawbacks. A large inventory of pads and the workforce to apply them must be maintained. The pads must be custom cut for each automobile model. The pads and their application results in significant dust generation which hinders the paint process and reduces paint quality.

To address the challenges of the bitumen pads and to simultaneously improve damping, LASD was developed. LASD relies on the preparation of a highly filled systems including 50 wt % to 80 wt % inorganic fillers (e.g. $CaCO_3$, $BaSO_4$, mica, and the like), 20 wt % to 50 wt % polymer binder (emulsion), and about 5 wt % additives (e.g. rheology modifiers, defoamers, etc.). The high viscosity, typically shear thinning formulation can then be strategically spray applied by robots. This approach reduces necessary inventory space, workforce, and vehicle weight. The vehicle model is of no consequence as the robots are routinely programmed to handle a multitude of body shapes and sizes. The current industry trend is to achieve higher damping with less material. Therefore, the polymeric binder and the overall formulation must be continually optimized.

Quantifying Damping. Under dynamic mechanical loading several viscoelastic materials (i.e. polymers) have the ability to effectively dissipate mechanical energy as heat. This phenomenon, known as viscous damping, is a complex response sensitive to both temperature and vibration frequency. It occurs because, over a broad range of temperature and strain rates, viscoelastic materials follow neither Hooke's law of perfectly elastic solids (i.e. stress is proportional to strain and independent of strain rate) nor Newton's law of perfectly viscous liquids (i.e. stress is proportional to strain rate and independent of strain). Instead, these materials exhibit both elastic (energy storage) and viscous (energy loss) behavior. The duality of this material is best described by the complex modulus (E*) equation where the E' and E" are the storage and loss moduli, respectively:

$$E^* = E' + iE''$$ (Equation 1)

This equation can also be written as follows.

$$E^* = E'(1+i\eta)$$ (Equation 2).

In Equation 2, $\eta = \tan \delta = E''/E'$.

In order to quantify damping in a LASD formulation the Oberst test is often employed. To perform this analysis a thin steel bar is first coated with a desired thickness of LASD formulation. The dimensions of the bar can vary depending on customer specifications. The bar is then placed in an oven to remove water. One end of the bar is then sandwiched between two root blocks to prevent any vibrations from occurring in the clamped section of the bar. The bar is clamped in a fixture and enclosed in a climate chamber. Vibrational displacement is measured using a piezoelectric or motion transducer. A computer driven magnetic exciter applies a range of vibrational frequencies to the bar over a set temperature range. At each temperature the reduction in vibration is measured and compared to an uncoated steel bar. The vibrational reduction is termed the composite loss factor (CLF) and is plotted versus temperature.

Emulsion Synthesis. All percentages are weight percentages unless specified otherwise.

Example 1: Synthesis of a Resin-Supported Emulsion Polymer Containing n-Butyl Acrylate, Methyl Methacrylate, and Styrene A glass 2 L four-neck flask was fitted with an overhead stirrer and reflux condenser. Deionized water (217.1 g), an alkali dispersed resin (35% in water, 131.9 g), Disponil® AFX 1080 (80% in water, 4.9 g), and Dowfax® 2A1 (45% in water, 2.0 g) were added to the reactor under an atmosphere of nitrogen. The solution was stirred (about 130 rpm) and heated to 85° C. before charging tert-butyl hydroperoxide (70% in water, 0.7 g) to the reactor. This was immediately followed by the addition of an ammonium persulfate solution (10.7% in water, 16.8 g) and a 15 min hold. A solution containing styrene (104.1 g) and n-butyl acrylate (108.2 g) was fed to the reactor over 50 min and flushed with deionized water (10.0 g). Deionized water (86.6 g) was fed simultaneously over the same 50 minutes. Following the feeds, the reaction was held at 85° C. for 10 min. A second monomer mixture containing methyl methacrylate (92.4 g) and n-butyl acrylate (100.1 g), and deionized water feed (78.0 g) were simultaneously added to the reactor over 50 minutes. The second monomer feed was flushed to the reactor with deionized water (5.6 g). The reaction was held at 85° C. for 30 minutes before feeding a solution of sodium erythorbate (3.9% in water, 15.7 g) over 10 minutes. The reaction was held an additional 10 minutes before adding ammonium hydroxide (4.2% in water, 11.8 g) and a deionized water flush (5.6 g). The reaction was cooled to room temperature before adding Acticide® MBS (5% in water, 0.5 g) and a deionized water flush (8.0 g). The final emulsion was filtered before collection and characterization. The emulsion of Example 1 contained 45.8% solids, had a pH of 7.7, and a particle size of about 130 nm.

Example 2: Synthesis of Resin-Supported Emulsion Polymer Containing n-Butyl Acrylate and Methyl Methacrylate A glass 2 L four-neck flask was fitted with an overhead stirrer and reflux condenser. Deionized water (141.5 g) and an alkali dispersed resin (29.3% in water, 368.5 g) were added to the reactor under an atmosphere of nitrogen. The solution was stirred (about 130 rpm) and heated to 85° C. before adding a solution of ammonium persulfate (12% in water, 8.4 g) and a deionized water flush (5.0 g). The reaction was held for 10 minutes before feeding a monomer solution containing n-butyl acrylate (218.5 g), methyl methacrylate (214.8 g), and 2-ethylhexyl thioglycolate (4.7 g) over 90 minutes. A solution of ammonium persulfate (12% in water, 33.6 g) was fed, alongside the monomer solution, over 120 minutes. The monomer feed was flushed to the reactor with deionized water (5.0 g). After the ammonium persulfate feed ended the reaction was held at 85° C. for 30 minutes before cooling the emulsion to room temperature and filtering. The emulsion of Example 2 contained 55.4% solids, had a pH of 7.3, and a particle size of about 100 nm.

Example 3: Synthesis of Resin-Supported Emulsion Polymer Containing Ethyl Acrylate and Methyl Methacrylate A glass 2 L four-neck flask was fitted with an overhead stirrer and reflux condenser. Deionized water (222.6 g) and an alkali dispersed resin (29.9% in water, 328.3 g) were added to the reactor under an atmosphere of nitrogen. The solution was stirred (about 130 rpm) and heated to 85° C. before adding a solution of ammonium persulfate (11% in water, 8.3 g) and a deionized water flush (5.0 g). The reaction was held for 10 minutes before feeding a monomer solution containing ethyl acrylate (228.1 g), methyl methacrylate (165.2 g), and 2-ethylhexyl thioglycolate (4.3 g) over 90 minutes. A solution of ammonium persulfate (11% in water, 33.2 g) was fed, alongside the monomer solution, over 120 minutes. The monomer feed was flushed to the reactor with deionized water (5.0 g). After the ammonium persulfate feed ended the reaction was held at 85° C. for 30 minutes before cooling the emulsion to room temperature and filtering. The emulsion of Example 3 contained 50.0% solids, had a pH of 6.9, and a particle size of about 90 nm.

Example 4: Synthesis of Surfactant Supported Emulsion Polymer Control

A glass 2 L four-neck flask was fitted with an overhead stirrer and reflux condenser. Deionized water (276.0 g) and a polystyrene seed emulsion (32% in water, 9.1 g) were added to the reactor under an atmosphere of nitrogen. The solution was stirred (ca. 130 rpm) and heated to 90° C. before adding a solution of ammonium persulfate (7% in water, 10.8 g) and a deionized water flush (6.0 g). The reaction was held for 5 min before feeding an emulsified mixture containing deionized water (180.0 g), sodium dodecyl sulfate (29% in water, 8.3 g), 2-ethylhexyl thioglycolate (5.6 g), styrene (171.4 g), n-butyl acrylate (233.3 g), methyl methacrylate (175.0 g), and acrylic acid (3.5 g) over 225 min. A solution of ammonium persulfate (7% in water, 43.2 g) was fed alongside the emulsified mixture over 255 min. A deionized water flush (18.0 g) was added after completion of the emulsified mixture feed. After completion of the ammonium persulfate feed a solution of ammonia (5.3% in water, 29.5 g) was slowly added to the reactor. A solution of tert-butyl hydroperoxide (12% in water, 9.7 g) was then added to the reactor followed by a 20 min addition of sodium erythorbate (12% in water, 9.7 g). The emulsion was cooled to room temperature before adding Acticide® MBS (5% in water, 0.6 g) and deionized water (10.2 g). The final emulsion was filtered before characterization.

Example 5: Synthesis of Resin-Supported Emulsion Polymer Employing a High $T_g$ Resin A glass 2 L four-neck flask was fitted with an overhead stirrer and reflux condenser. Deionized water (164.5 g) and a resin dispersion (30% in alkaline water, $T_g$ 97° C., 500.0 g) were added to the reactor under an atmosphere of nitrogen. The solution was stirred (ca. 130 rpm) and heated to 85° C. before adding a solution of ammonium persulfate (5.2% in water, 10.6 g) and a deionized water flush (6.0 g). The reaction was held for 5 min before feeding a monomer solution containing styrene (133.1 g), n-butyl acrylate (177.0 g), methyl methacrylate (133.1 g), and 2-ethylhexyl thioglycolate (4.3 g) over 90 min. A solution of ammonium persulfate (5.2% in water, 42.5 g) was fed alongside the monomer solution over 120 min. The monomer feed was flushed to the reactor with deionized water (18.0 g). After the ammonium persulfate feed ended the reaction was held at 85° C. for 30 min before cooling the emulsion to room temperature and adding Acticide® MBS (5% in water, 0.6 g) and deionized water (10.2 g). The final emulsion was filtered before characterization.

Example 6: Synthesis of a Resin-Supported Emulsion Polymer Employing a Low $T_g$ Resin A glass 2 L four-neck flask was fitted with an overhead stirrer and reflux condenser. Deionized water (106.1 g) and a resin dispersion (28% in alkaline water, $T_g$ 70° C., 535.7 g) were added to the reactor under an atmosphere of nitrogen. The solution was stirred (ca. 130 rpm) and heated to 85° C. before adding a solution of ammonium persulfate (5.2% in water, 10.6 g) and a deionized water flush (6.0 g). The reaction was held for 5 min before feeding a monomer solution containing styrene (133.1 g), n-butyl acrylate (177.0 g), methyl methacrylate (133.1 g), and 2-ethylhexyl thioglycolate (4.3 g) over 90 min. A solution of ammonium persulfate (5.2% in water, 42.5 g) was fed alongside the monomer solution over 120 min. 45 min after beginning the monomer feed a solution of ammonia (1% in water, 22.8 g) was added to the reactor. The monomer feed was flushed to the reactor with deionized water (18.0 g). After the ammonium persulfate feed ended the reaction was held at 85° C. for 30 min before cooling the emulsion to room temperature and adding Acticide® MBS (5% in water, 0.6 g) and deionized water (10.2 g). The final emulsion was filtered before characterization.

Examples 7-9: Damping Evaluations

The LASD formulations for Examples 8-10 were made by combining the ingredients listed in the following Table A in sequential order with mechanical stirring. Thickener and water were added at the end to achieve the targeted solids level and the desired viscosity. The final formulations targeted a solids content near 82% and viscosity of approximately 40,000-100,000 cPs.

TABLE A

| | Ex 4 Emulsion Grams | Ex 5 Emulsion Grams | Ex 6 Emulsion Grams | Dispex® 4320 Grams | Foamaster® S Grams | Duramite® CaCO₃ Grams | C4000™ Mica Grams | Rheovis® 1152 Grams | Water Grams |
|---|---|---|---|---|---|---|---|---|---|
| Example 7 | 82.5 | | | 2.3 | 0.6 | 183.5 | 21.5 | 0.15 | 10.0 |
| Example 8 | | 82.5 | | 2.3 | 0.6 | 183.5 | 21.5 | 0.15 | 10.0 |
| Example 9 | | | 82.5 | 2.3 | 0.6 | 183.5 | 21.5 | 0.15 | 10.0 |

To obtain Oberst damping results, a clean steel bar (255 mm×12.7 mm×1 mm) was coated with the LASD formulation. A mold was used to achieve the desired application levels. The bar was then dried for 20 min at ambient temperature, 2 h at 90° C., 20 min at 140° C., 30 min at ambient temperature, and 30 min at 140° C. Bar coating weight, which correlates to damping performance, was determined from the mass difference of the clean and coated bar. As described above, root blocks and a piezoelectric sensor were attached. The bars were clamped in testing fixtures which were contained in an environmental chamber.

Figure 1:
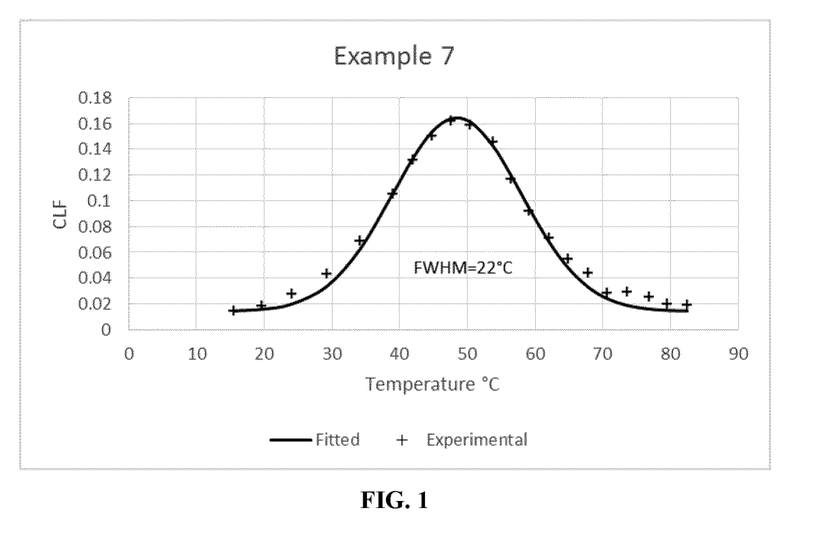
FIG. 1 is a graphical depiction of the broad damping profile exhibited by a liquid applied sound damping formulation provided herein.
Figure 2:
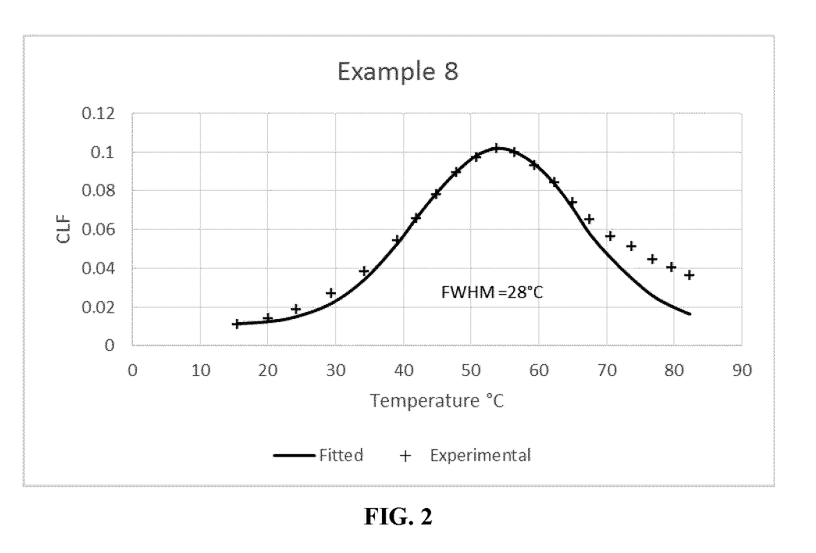
FIG. 2 is a graphical depiction of the broad damping profile exhibited by a liquid applied sound damping formulation provided herein.
Figure 3:
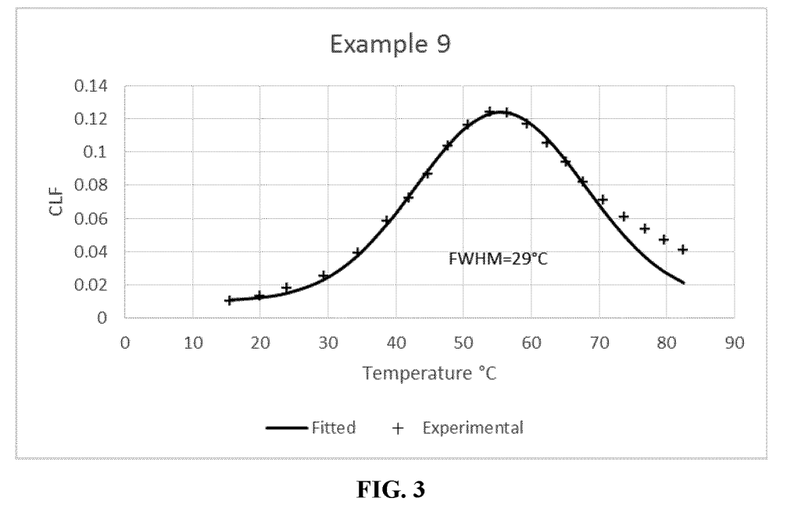
FIG. 3 is a graphical depiction of the broad damping profile exhibited by a liquid applied sound damping formulation provided herein.

The damping results for Examples 7-9 are shown in FIGS. 1-3. The experimental data was fit using a Gaussian distribution and the full width at half maximum height (FWHM) was determined. As shown, the width at half maximum height increases from 22° C. to 28° C. and 29° C., which is more than a 25% increase.

Example 10: Water Sensitivity

Water sensitivity was measured by calculating the percent weight increase, due to water absorption, of a dried LASD sample when submerged in water for a period of time.

Reduced water absorption by dried LASD materials is often a critical performance criterion. To determine water uptake, an LASD formulation was coated (2 mm thick) on a poly(tetrafluoroethylene) film. The coating was then dried under ambient conditions for 24 hours before drying in a 160° C. oven for 30 minutes. A section of the coating was removed, weighed, and placed in a sealed container filled with deionized water. At various times the sample was removed, blotted of excess water, and re-weighed allowing for determination of water uptake.

Table B below shows the seven day water uptake by the LASD formulations of Examples 4-6.

TABLE B

|  | Initial wt (g) | Final wt (g) | Water Uptake (%) |
| --- | --- | --- | --- |
| Example 4 | 1.96 | 2.25 | 14.8 |
| Example 5 | 1.97 | 2.16 | 11.7 |
| Example 6 | 2.14 | 2.30 | 7.5 |

The results from the above table show that the water sensitivity can be significantly reduced using a resin supported emulsion instead of a surfactant supported emulsion.

Example 11: Recovery of Paint Saturated Filter Aid (Calcium Carbonate)

Alkaline earth metal carbonates are employed as filter media to capture paint booth overspray; for example, during the spray painting of new automobiles. In particular, new virgin calcium carbonate is contained in filter screens within a device to capture paint over spray on a painting production line during automobile manufacture. Once the filter is saturated with paint, the calcium carbonate is spent and discharged from the device. This spent calcium carbonate is dried to a constant weight in a vacuum oven to remove solvent. The dried spent calcium carbonate is screened to a finer particle size distribution of 44 or less microns.

Example 12. Incorporation of Paint Saturated Dried Calcium Carbonate into Liquid Applied Sound Damping (LASD) Compositions The LASD compositions A and B are made by combining the ingredients listed in the Table 1 in sequential order with mechanical stirring. Thickener and water are added at the end to achieve the targeted solids level and the desired viscosity. The final formulations have a solids content 80±3% and viscosity of approximately 80,000±20,000 cPs. To obtain Oberst damping results, a clean steel bar (255 mm×12.7 mm×1 mm) is coated with the LASD formulation using a draw down tool. The bar is then dried for 20 minutes at ambient temperature, 2 hours at 90° C., 20 minutes at 140° C., 30 minutes at ambient temperature, and 30 minutes at 140° C. Bar coating weight, which correlates to damping performance, is determined from the mass difference of the clean and coated bar. The target coat weight is 2.40-2.50 kg/m$^2$. The bars are clamped in testing fixtures which are contained in an environmental chamber. The testing protocol followed SAE J 1637 and ASTM E 756.

TABLE 1

LASD Compositions using Pluronic F-87

|  | Composition | |
| --- | --- | --- |
|  | A | B |
| Pluronic F-87 (%) | 1.31 | 1.32 |
| Acronal S504 (%) | 25.85 | 26.11 |
| CaCO$_3$ (recycled) (%) | — | 57.61 |
| CaCO$_3$ (virgin) (%) | 57.02 | — |
| Suzorit E80-SF (%) | 5.52 | 5.58 |
| Water (%) | 5.44 | 5.49 |
| Disponil AFX 4030 | 0.24 | 0.25 |
| Dispex CX 4230 | 0.29 | 0.29 |
| Foamaster WBA (%) | 0.49 | 0.50 |
| Propylene Glycol (%) | 0.57 | 0.57 |
| Attagel 40 (%) | 3.3 | 2.3 |
| Total | 100 | 100 |
| CLF (%)* | 0.1233 | 0.169 |

*CLF is the Composite Loss Factor as measured at 200 Hz and 26° C.;

Using the recycled calcium carbonate of Composition B, a higher CLF value is obtained versus virgin calcium carbonate of Composition A, which indicates a greater sound damping effect.

Example 13. Incorporation of Paint Saturated Dried Calcium Carbonate into Liquid Applied Sound Damping (LASD) Compositions Following the procedure of Example 12, composition A, compositions C and D were prepared by replacing Pluronic F-87 with Disponil AFX 4030. The compositions are in Table 2.

TABLE 2

LASD Compositions using Disponil AFX 4030.

|  | Composition | |
| --- | --- | --- |
|  | C | D |
| Disponil AFX (%) | 1.76 | 1.76 |
| Dispex CX 4230 | 0.7 | 0.7 |
| Acronal S504 (%) | 26.09 | 26.21 |
| CaCO$_3$ (recycled) (%) | — | 58.35 |
| CaCO$_3$ (virgin) (%) | 58.09 | — |
| Suzorit E80-SF (%) | 5.60 | 5.62 |
| Water (%) | 4.22 | 4.24 |
| Foamaster WBA (%) | 0.51 | 0.51 |
| Propylene Glycol (%) | 0.56 | 0.57 |
| Attagel 40 (%) | 2.5 | 2.0 |
| Total | 100 | 100 |
| CLF (%)* | 0.110 | 0.137 |

*CLF is the Composite Loss Factor as measured at 200 Hz and 22° C.

Using the recycled calcium carbonate Composition D results in a higher CLF value compared to Composition C. This indicates a greater sound damping effect.

Example 14. Incorporation of Paint Saturated Dried Calcium Carbonate into Liquid Applied Sound Damping (LASD) Compositions Following the procedures above, Compositions E and G were prepared using Disponil AFX 4030 with Lumiten ISC. The results are shown in Table 3.

TABLE 3

LASD Compositions using Lumiten ISC

| | Composition | |
|---|---|---|
| | E | G |
| Luminten ISC (%) | 0.88 | 0.89 |
| Disponil AFX | 0.24 | 0.25 |
| Acronal S504 (%) | 26.08 | 26.15 |
| CaCO$_3$ (recycled) (%) | — | 57.69 |
| CaCO$_3$ (virgin) (%) | 57.55 | — |
| Suzorit E80-SF (%) | 5.57 | 5.58 |
| Water (%) | 7.11 | 7.12 |
| Foamaster WBA (%) | 0.50 | 0.50 |
| Propylene Glycol (%) | 0.57 | 0.57 |
| Attagel 40 (%) | 1.5 | 1.3 |
| Total | 100 | 100 |
| CLF (%)* | 0.124 | 0.229 |

*CLF is the Composite Loss Factor as measured at 200 Hz and 22° C.

Again the composition with the recycled CaCO$_3$ exhibits a greater sound damping effect that the virgin material.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of damping mechanical vibration, the method comprising:
    applying on a source of mechanical vibration a formulation comprising:
        an aqueous polymer emulsion prepared by an emulsion polymerization reaction of an emulsion-polymerizable monomer and a support resin, and wherein the aqueous polymer emulsion is free of surfactant;
        wherein the support resin has a number average molecular weight from about 500 g/mol to about 50,000 g/mol,
        wherein the support resin has an acid number from 30 to 200, and
        wherein the support resin has a glass temperature (Tg) from 0 to 130° C.

2. The method of claim 1, wherein the support resin has a number average molecular weight from about 500 g/mol to about 25,000 g/mol.

3. The method of claim 1, wherein the applying comprises spraying, painting, or spreading the formulation on the source of mechanical vibration.

4. The method of claim 1, wherein the applying comprises forming a damping layer from the formulation on a surface of the source of the mechanical vibration, wherein the layer has a thickness from about 0.5 to about 10 mm.

5. The method of claim 1, wherein the support resin comprises a carboxylic acid-functional support resin.

6. The method of claim 5, wherein the carboxylic acid-functional support resin can be prepared from acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, vinyl chloride, ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate, diacetone acrylamide, or mixtures of any two or more such monomers.

7. The method of claim 1, wherein the support resin comprises acrylic acid and styrene.

8. The method of claim 1, wherein a weight ratio of the emulsion-polymerizable monomer and the support resin is from about 1:1 to about 50:1.

9. The method of claim 1, wherein the formulation comprises from about 10 wt % to about 80 wt % of the aqueous polymer emulsion.

10. The method of claim 1, wherein the emulsion-polymerizable monomer does not include styrene.

11. The method of claim 1, wherein the emulsion-polymerizable monomer comprises a $C_1$-$C_8$ acrylate, a $C_1$-$C_8$ (meth)acrylate, or a mixture of any two or more thereof.

12. The method of claim 1, wherein the emulsion-polymerizable monomer comprises n-butyl acrylate, methyl acrylate, methyl methacrylate, styrene, ethyl acrylate, 2-ethylhexyl acrylate, or a mixture of any two or more thereof.

13. The method of claim 1, wherein the formulation further comprises calcium carbonate.

14. The method of claim 13, wherein the calcium carbonate comprises spent calcium carbonate.

15. The method of claim 4, wherein the formulation has a composite loss factor from 0.02 to 0.229 at 20-30 C measured at 200 Hertz.

16. The method of claim 4, wherein the formulation has a water uptake of less than 11.7 percent by weight.

* * * * *